United States Patent Office 2,705,357
Patented Apr. 5, 1955

2,705,357

CLOSED HOOKS

Einar Davick, Haugesund, Norway

Application September 9, 1952, Serial No. 308,592

2 Claims. (Cl. 24—241)

This invention concerns a closed hook for use, for example, as a hoist hook and of the kind comprising a hook part, a guard part pivoted thereon and a catch device which, in closed position of the hook, locks the guard part in place.

According to the present invention, a hook of the kind described is characterised by the provision of a catch device for the guard part of the hook consisting of a spring loaded lever which, when the hook is closed, rests against the guard part of the hook and checks an undesired opening of the hook.

Further features of the hook will be described in the following description with reference to the accompanying drawing, which shows one preferred example of the hook constructed according to the invention, and wherein.

Figures 1, 2:
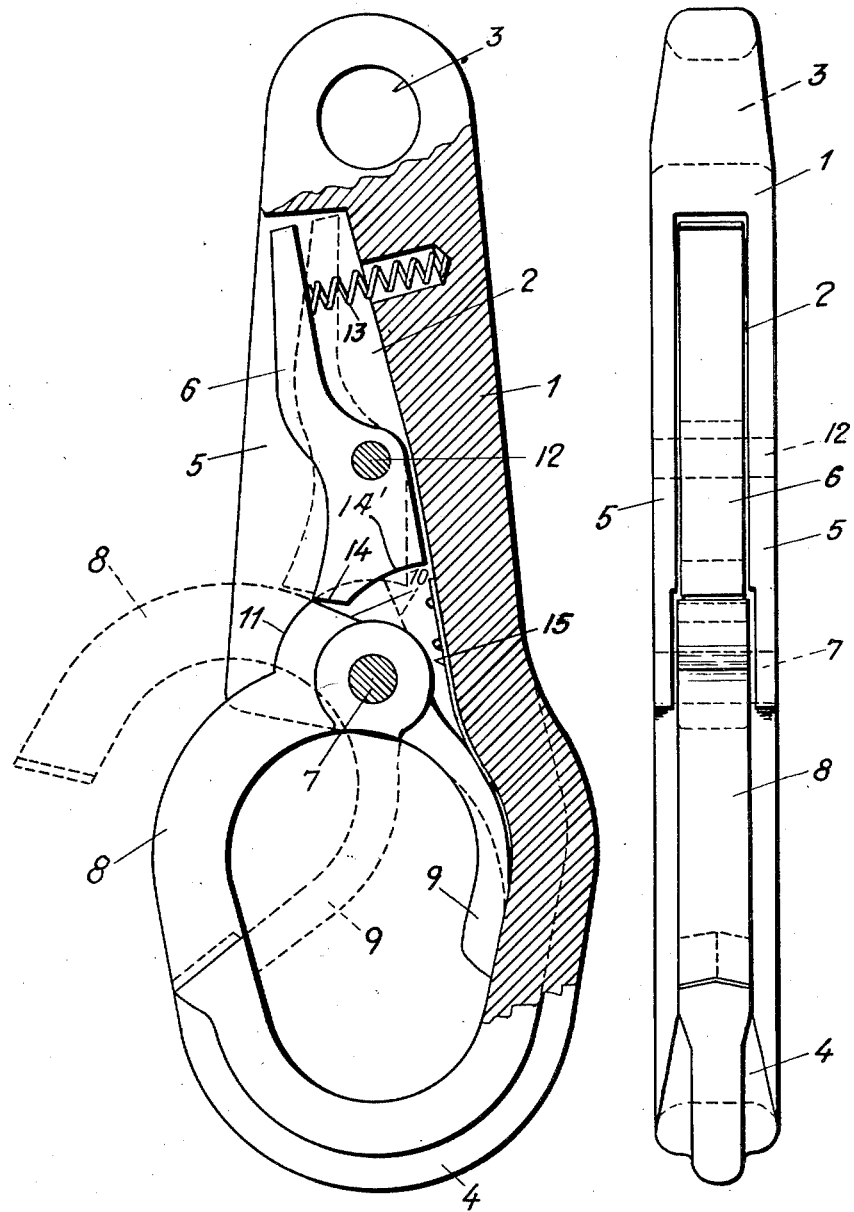
Fig. 1 shows in side elevation, partly in section, the hook in a closed position and with the pivoted guard part in the open position indicated by dotted lines.
Fig. 2 shows the hook as seen from the front.

The hook consists of a body part 1 with a middle open recess 2 flanked by two walls 5. A spring loaded lever 6, mounted on a pivot 12 and maintained in full line position (Fig. 1) by a spring 13, is housed in the recess 2, and, whatever its position, is shielded and never exposed to inadvertent thrusts from outside the recess. The swinging guard part of the hook is of U shape and provides two arcuate arms 8, 9, and is mounted on a pivot 7 so that it can swing. At the upper part of the hook, the body part 1 has a hole 3 for fastening of the shackle of a hoisting cable and the lower part of the body is constituted as hook 4. The arm 8 of the movable guard part 8, 9, is, at the tip, formed with a groove that corresponds to a wedge-formed end provided at the tip of the hook 4. The lower end of the lever 6, which co-operates with the base of the U-shaped member, has a recess 14' connecting with nose or projection 14 of curvilinear form which corresponds to the curved portion 11 of said base, so that, in the open position of the hook, a comparatively large surface of the lever 6 bears against the guard 8, 9, and the lever 6 will be checked against an undesired closing action.

The lever 6 also has a projecting terminal portion or nose 14 which, when the hook is closed, rests against a face 10 on the guard part 8, 9, so that the guard part 8, 9 is locked and cannot open during hoisting. In the closed position, the arm 9 of the guard part rests against the inner face of the hook part 4. When a load is put on the hook, the weight of the load will automatically lock the guard part 8, 9. Opening of the hook is effected by means of pressing against the upper arm of the lever 6, against the effect of the spring 13. In order to facilitate such opening, a flat spring 15 is arranged along the inner wall of the hook, which presses against the arm 9. As the lever 6 is always resting in the open recess 2, there is no risk of the lever being actuated by blows from outside during hoisting.

What I claim and desire to secure by Letters Patent is:

1. An openable and closable hook of the character described comprising a body part having a shielded recess between and defined by a pair of walls of such body part, a spring-loaded lever pivotally mounted in said recess and having at its lower end a curvilinear recess connecting with a projecting terminal portion, a swingable U-shaped guard part pivotally mounted in said body part beneath said lever and having a pair of arcuate arms one of which rests against the inner wall of said body part forming the inner terminus of the recess when the hook is closed and the other of which has a convex curvilinear portion near its pivot and adapted to interfit with the curvilinear recess at the lower end of said lever when the hook is open, said guard part being provided with an abutment face with which the projecting terminal portion of said lever is adapted to make contact.

2. A hook in accordance with claim 1 in which a flat spring is disposed on the inner wall of the body part pressing against the first-named arm of said guard part when the hook is closed.

References Cited in the file of this patent

UNITED STATES PATENTS

| 70,750 | Sargent | Nov. 12, 1867 |
| 588,273 | Fleming | Apr. 14, 1896 |
| 768,069 | O'Brien | Aug. 23, 1904 |

FOREIGN PATENTS

| 755,980 | France | Sept. 18, 1933 |